United States Patent
Allaert et al.

(10) Patent No.: US 9,312,803 B2
(45) Date of Patent: Apr. 12, 2016

(54) CONTROL METHOD IMPLEMENTED IN A VARIABLE SPEED DRIVE

(71) Applicant: Schneider Toshiba Inverter Europe SAS, Pacy sur Eure (FR)

(72) Inventors: Yves-Laurent Allaert, Vernon (FR); Mehdi Messaoudi, Lille (FR); Hocine Boulharts, Triel sur Seine (FR)

(73) Assignee: SCHNEIDER TOSHIBA INVERTER EUROPE SAS, Pacy sur Eure (FR)

(*) Notice: Subject to any disclaimer, the term of this patent is extended or adjusted under 35 U.S.C. 154(b) by 86 days.

(21) Appl. No.: 14/326,827

(22) Filed: Jul. 9, 2014

(65) Prior Publication Data

US 2015/0035468 A1 Feb. 5, 2015

(30) Foreign Application Priority Data

Jul. 31, 2013 (FR) .................................... 13 57586

(51) Int. Cl.
*H02P 27/06* (2006.01)
*H02M 1/08* (2006.01)
(Continued)

(52) U.S. Cl.
CPC .................. *H02P 27/06* (2013.01); *H02M 1/08* (2013.01); *H02M 5/4585* (2013.01); *H02M 2001/0029* (2013.01); *H02M 2001/123* (2013.01)

(58) Field of Classification Search
CPC ..... H02K 41/03; H02P 27/06; H02P 2201/09; H02P 27/08; H02P 6/10; H02P 6/002
USPC ......... 318/442, 478, 479, 500, 503, 504, 705, 318/807, 811, 812; 363/34, 35, 37, 40, 41, 363/44, 45, 46
See application file for complete search history.

(56) References Cited

U.S. PATENT DOCUMENTS 4,761,600 A * 8/1988 D'Atre ................... H02P 23/06
                                                    318/758
5,225,712 A * 7/1993 Erdman ................ F03D 7/0272
                                                    290/44
(Continued)

FOREIGN PATENT DOCUMENTS

DE    100 10 350 A1   9/2001
EP    1 148 622 A2    10/2001

OTHER PUBLICATIONS

French Preliminary Search Report and Written Opinion issued Jul. 1, 2014, in Patent Application No. 1357586, filed Jul. 31, 2013 (with English Translation of Category of Cited Documents).
(Continued)

*Primary Examiner* — Bentsu Ro
(74) *Attorney, Agent, or Firm* — Oblon, McClelland, Maier & Neustadt, L.L.P.

(57) ABSTRACT

The invention relates to a method of control implemented in a variable speed drive, said method comprising the following steps of:
  for a switching of a transistor (100) of the rectifier stage (1), determination of a first control signal ($C_e$) corresponding to a first gate current (Ige) to be applied to the gate of the transistor to be switched so as to act on the rate of the variation of a first voltage (Vrec) generated by the switching,
  for a switching of a transistor (200) of the inverter stage (2), determination of a second control signal ($C_s$) corresponding to a second gate current to be applied to the gate of the transistor to be switched so as to act on the rate of the variation of a second voltage (Vinv) generated by the switching,
  determination of a first instant of switching (te) of the transistor of the rectifier stage and of a second instant of switching (ts) of the transistor of the inverter stage (2), the first control signal (Ce), the second control signal (Cs), the first instant of switching and the second instant of switching being determined so as to minimize the difference between the first voltage (Vrec) and the second voltage (Vinv).

9 Claims, 3 Drawing Sheets

(51) Int. Cl.
   *H02M 5/458* (2006.01)
   *H02M 1/00* (2007.01)
   *H02M 1/12* (2006.01)

(56) References Cited

U.S. PATENT DOCUMENTS

| | | | |
|---|---|---|---|
| 6,185,115 B1 * | 2/2001 | Sul et al. | H02M 5/4585 363/37 |
| 7,405,528 B2 * | 7/2008 | Ho et al. | H02M 1/44 318/400.25 |
| 8,400,085 B2 * | 3/2013 | Rineh et al. | H02P 27/08 318/375 |
| 8,817,499 B2 * | 8/2014 | Videt et al. | H02M 1/44 363/37 |
| 2001/0045100 A1 | 11/2001 | Bay | |
| 2004/0130923 A1 | 7/2004 | Yin Ho et al. | |
| 2006/0119303 A1 | 6/2006 | Ho et al. | |
| 2006/0186854 A1 | 8/2006 | Ho et al. | |
| 2007/0210847 A1 | 9/2007 | Baudesson et al. | |
| 2012/0081932 A1 | 4/2012 | Videt et al. | |

OTHER PUBLICATIONS

Hyeoun-Dong Lee, et al., "A Common-Mode Voltage Reduction in Converter-Inverter System by Shifting Active Space Vector in a Sampling Period", Applied Power Electronics Conference and Exposition, vol. 2, XP010323589, Mar. 14, 1999, pp. 1046-1051.

* cited by examiner

CONTROL METHOD IMPLEMENTED IN A VARIABLE SPEED DRIVE

TECHNICAL FIELD OF THE INVENTION

The present invention pertains to a method of control implemented in a variable speed drive for reducing the common mode voltage and current and to the corresponding variable speed drive.

PRIOR ART

A variable speed drive comprises several input phases connected to the network, for example three input phases if it is connected to a three-phase network. Connected to its input phases, a conventional variable speed drive comprises a rectifier stage making it possible to transform the AC voltage provided by the network into a DC voltage. The variable speed drive also comprises a DC power supply bus furnished with a first power supply line at positive potential and with a second power supply line at negative potential and between which is applied the DC voltage and a bus capacitor connected between the first power supply line and the second power supply line and intended to maintain the DC voltage on the bus constant. Downstream of the bus capacitor, a power converter of variable speed drive type also comprises an inverter stage furnished with several switching arms, as a general rule three switching arms, each connected to an output phase wired up to an electrical load. Each switching arm is connected between the first power supply line and the second power supply line of the bus and comprises, for example in the case of a converter with two levels, two controlled power transistors for transforming the DC voltage into a variable voltage intended to the electrical load.

The rectifier stage placed at the input of the converter can be of active type by also comprising several switching arms each furnished for example with at least two power transistors. These transistors are each controlled by a gate control device so as to be able to transform the AC voltage of the network into a DC voltage applied to the power supply bus. This type of converter with an active rectifier stage at input is commonly called an "Active front end".

In a conventional manner, the commands of the power transistors of the rectifier stage and of the inverter stage are controlled by pulse width modulation (hereinafter PWM). A PWM of intersective type consists in comparing a symmetric or asymmetric triangular carrier with one or more modulants. For a power transistor of the inverter stage or of the rectifier stage, the intersections between a carrier and one or more modulants define the instants of switching on and off of the transistor.

It is known that raising the chopping frequency applied to an inverter stage causes an increase in the common mode current. The common mode current generated can follow various paths between a variable speed drive and an electrical load. These paths are created by capacitive couplings generated between the conductors of the cable linking the variable drive to the electrical load, between the windings of the motor and the stator or between the power semi-conductors and the earthed dissipater etc. When the variable speed drive comprises an inverter stage and an active rectifier stage, the total common mode voltage of the variable speed drive is the sum of the disturbances provided by the rectifier stage and by the inverter stage.

Various solutions have been developed for reducing the common mode current. These solutions can consist of the addition of a passive filter and/or of an action on the controls of the rectifier stage and of the inverter stage.

The document JP2003018853 proposes for example a process for reducing the common mode current in a variable speed drive by synchronizing the switching on (or off) of three power transistors (high or low) of the rectifier stage with the switching on (or off) of the corresponding three transistors (respectively high or low) of the inverter stage. This solution makes it possible to reduce the dimension of the filter employed for filtering the common mode current and therefore to decrease the costs of the converter. However, it does not make it possible to reduce the common mode current sufficiently.

U.S. Pat. No. 6,185,115 also describes a process making it possible to synchronize the switchings of the rectifier stage with the switchings of the inverter stage so as to reduce the common mode voltage. Just as in respect of the document cited above, this process is not satisfactory since it does not make it possible to reduce the common mode voltage sufficiently in the variable speed drive. Indeed, the proposed process consists in synchronizing the switching of a single switching arm of the inverter stage, at a rising and falling edge, with the switching of a single switching arm of the rectifier stage thereby making it possible, over a chopping period, to go only from twelve voltage edges to eight voltage edges on all the switching arms.

Patent application EP2442436A2 also describes a process for synchronizing the switchings between the rectifier stage and the inverter stage. The process makes it possible to synchronize each switching of a transistor of the rectifier stage with a switching of the inverter stage, thus making it possible to reduce the total common mode voltage generated.

However, the solutions described in these earlier patents are not sufficient. The common mode voltage generated on the rectifier side and the common mode voltage generated on the inverter side do not eliminate one another solely through the synchronizing of the switchings.

The aim of the invention is to propose a variable speed drive with active rectifier furnished with a solution for reducing in a more pronounced manner the common mode voltage generated at the level of the rectifier stage and at the level of the inverter stage.

DISCLOSURE OF THE INVENTION

This aim is achieved by a method of control implemented in a variable speed drive which comprises:
- a rectifier stage connected to several input phases receiving an input current and an inverter stage connected to several output phases on which there flows an output current destined for an electrical load,
- a DC power supply bus linking the rectifier stage to the inverter stage and comprising a first power supply line and a second power supply line,
- the rectifier stage and the inverter stage each comprising at least two switching arms connected to the first power supply line and to the second power supply line, each switching arm comprising at least two transistors,
- the method of control comprising the following steps of:
- for a switching of a transistor of the rectifier stage, determination of a first control signal corresponding to a first gate current to be applied to the gate of the transistor to be switched so as to act on the rate of the variation of a first voltage generated by the switching,
- for a switching of a transistor of the inverter stage, determination of a second control signal corresponding to a second gate current to be applied to the gate of the transistor to be switched so as to act on the rate of the variation of a second voltage generated by the switching,
determination of a first instant of switching of the transistor of the rectifier stage and of a second instant of switching of the transistor of the inverter stage,
the first control signal, the second control signal, the first instant of switching and the second instant of switching being determined so as to minimize the difference between the first voltage and the second voltage.

According to a particular feature, the determination of the first control signal is carried out taking account of the input current.

According to another particular feature, the determination of the second control signal is carried out taking account of the output current.

The invention also relates to a variable speed drive comprising:
- a rectifier stage connected to several input phases receiving an input current and an inverter stage connected to several output phases on which there flows an output current destined for an electrical load,
- a DC power supply bus linking the rectifier stage to the inverter stage and comprising a first power supply line and a second power supply line,
- the rectifier stage and the inverter stage each comprising at least two switching arms connected to the first power supply line and to the second power supply line, each switching arm comprising at least two transistors, the variable speed drive comprising:
- for a switching of a transistor of the rectifier stage, a first module for determining a first control signal corresponding to a gate current to be applied to the gate of the transistor to be switched so as to act on the rate of the variation of a first voltage generated by the switching,
- for a switching of a transistor of the inverter stage, a second module for determining a second control signal corresponding to a second gate current to be applied to the gate of the transistor to be switched so as to act on the rate of the variation of a second voltage generated by the switching,
- a third module for determining a first instant of switching of the transistor of the rectifier stage and a second instant of switching of the transistor of the inverter stage,
the first control signal, the second control signal, the first instant of switching and the second instant of switching being determined so as to minimize the difference between the first voltage and the second voltage.

According to a particular feature, the first determining module is designed to take account of the input current.

According to another particular feature, the second determining module is designed to take account of the output current.

According to another particular feature, the variable speed drive comprises a set of resistors connected to the gate of each transistor so as to be able to vary its gate current.

According to another particular feature, the first determining module is designed to take account of the switching losses generated in the transistors to be switched of the rectifier stage.

According to another particular feature, the second determining module is designed to take account of the switching losses generated in the transistors to be switched of the inverter stage.

BRIEF DESCRIPTION OF THE FIGURES

Other characteristics and advantages will become apparent in the detailed description which follows offered with regard to the appended drawings in which.

DETAILED DESCRIPTION OF AT LEAST ONE EMBODIMENT

Figure 1:
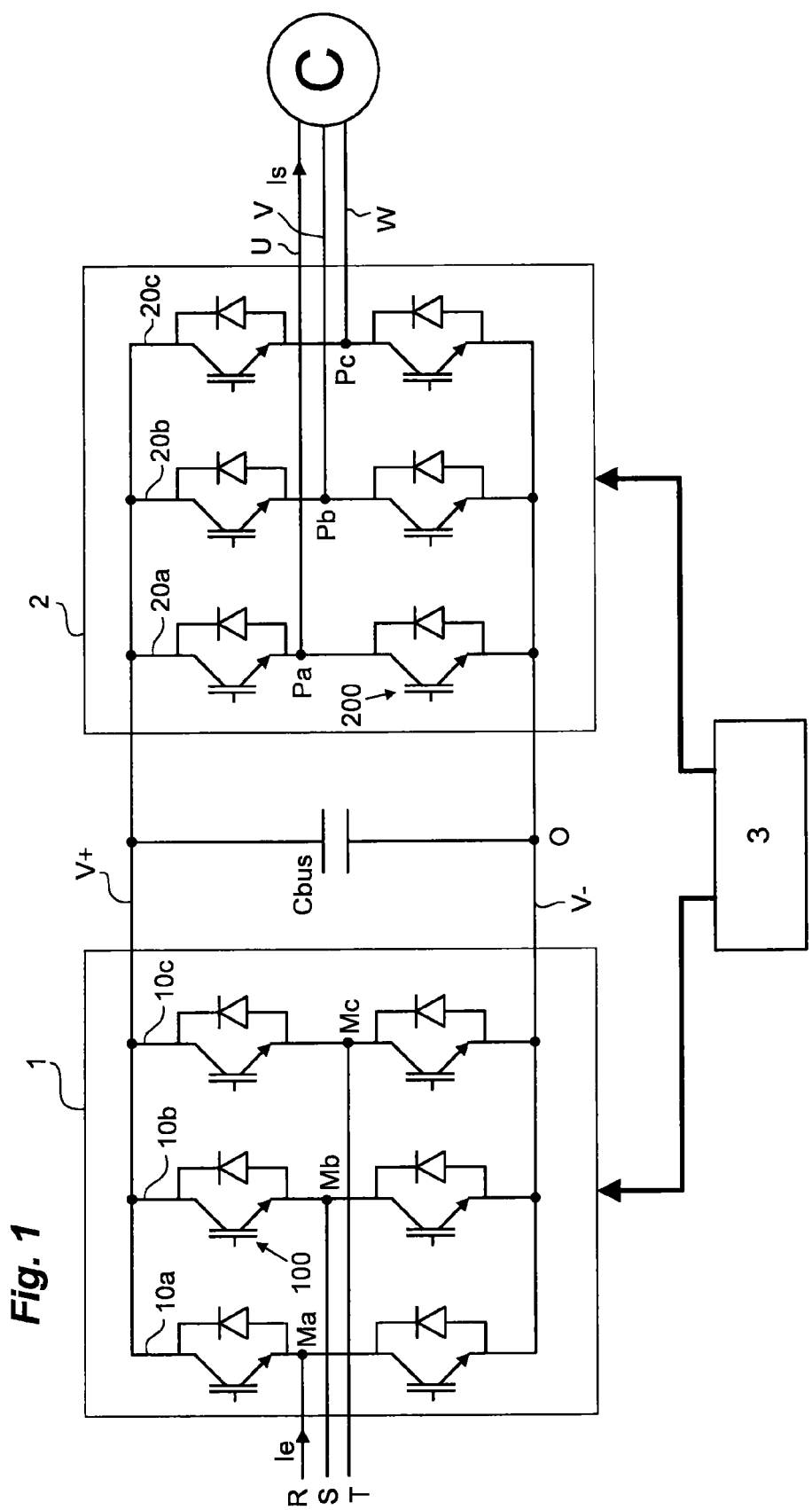
FIG. 1 represents, in a schematic manner, a variable speed drive in accordance with the invention.

With reference to FIG. 1, in a known manner, a variable speed drive comprises a rectifier stage 1, a DC power supply bus and an inverter stage 2. Various configurations of variable speed drive are possible. The present invention applies most particularly to variable speed drives comprising an active rectifier stage.

FIG. 1 represents for example a two-level variable speed drive furnished with an active rectifier stage 1.

With reference to FIG. 1, the rectifier stage 1 is connected to the network via inductances AC (not represented), for example on three input phases R, S, T for a three-phase rectifier stage 1. Customarily, in a variable speed drive, the rectifier stage is composed of a diode bridge. However, the rectifier stage 1 can also be of active type by comprising one or more identical controlled switching arms 10a, 10b, 10c. The rectifier stage 1 is thus driven so as to control the current tapped off from the network and to transform the AC voltage provided by the network into a DC voltage applied to the DC power supply bus. On a three-phase network, the rectifier stage 1 comprises three switching arms 10a, 10b, 10c each connected to one of the three input phases R, S, T of the three-phase network through the inductances AC. In a conventional configuration, each switching arm comprises for example two power transistors 100, for example of IGBT or JFET type and a connection midpoint Ma, Mb, Mc situated between the two transistors and connected to an input phase R, S, T. The DC power supply bus links the rectifier stage 1 to the inverter stage 2. It comprises a power supply line at positive potential V+ and a power supply line at negative potential V−. At least one bus capacitor Cbus is connected to each of the two power supply lines of the bus and makes it possible to maintain the voltage of the bus at a constant value.

In FIG. 1, the inverter stage 2 is connected to the DC power supply bus, downstream of the bus capacitor Cbus. It comprises several identical switching arms 20a, 20b, 20c each connected to an output phase U, V, W linked to the electrical load C. For an electrical load C operating in three-phase mode, the inverter stage 2 thus comprises three switching arms 20a, 20b, 20c. In an inverter stage 2 of conventional configuration (FIG. 1), each switching arm 20a, 20b, 20c comprises two power transistors 200 and a connection midpoint Pa, Pb, Pc situated between the two transistors and connected to the electrical load.

The variable drive also comprises a control unit 3 making it possible to control the switching of each of the switching arms of the rectifier stage 1 and the switching of each of the switching arms of the inverter stage 2. For each switching of a power transistor of a switching arm, the control unit 3 uses control by Pulse Width Modulation (PWM) making it possible to define the instants of switching of each transistor of the rectifier stage 1 and of the inverter stage 2. The conventional PWM control is of intersective type and consists in comparing a symmetric or asymmetric triangular carrier with one or more modulants. The intersections between the carrier and the modulant or modulants define the instants of switching on and off of the power transistor.

The method of control of the invention applies to a variable speed drive which comprises one and the same number of switching arms, for example three switching arms, on the rectifier stage 1 and the inverter stage 2, each arm comprising at least two power transistors. Preferably, the number of levels of the rectifier stage 1 is identical to the number of levels of the inverter stage 2. In FIG. 1, the rectifier stage 1 with two levels is thus associated with a conventional inverter stage 2 with two levels.

The invention is directed at reducing in a consequent manner the common mode current in a variable speed drive which comprises an active rectifier stage 1 and an inverter stage 2.

This variable speed drive structure in fact exhibits two common-mode voltage sources related to the presence of switchings on the inverter stage 2 and on the rectifier stage 1. By switching, the inverter stage 2 generates a common mode voltage dubbed Vmcinv and the rectifier stage 1 generates a common mode voltage Vmcrec defined by the following relations:

$$Vmcinv = \frac{V_{U0} + V_{V0} + V_{W0}}{3}$$

$$Vmcrec = \frac{V_{R0} + V_{S0} + V_{T0}}{3}$$

In which:
$V_{U0}$, $V_{V0}$, $V_{W0}$, correspond to the simple voltages on the output phases U, V, W of the inverter stage and referenced to the low point (O) of the DC power supply bus,
$V_{R0}$, $V_{S0}$, $V_{T0}$ correspond to the simple voltages of each arm of the rectifier stage and referenced to the low point (O) of the DC power supply bus.

The total common mode voltage of the variable speed drive is equal to the sum of the disturbances provided by the rectifier stage 1 and by the inverter stage 2. As the common mode voltages generated by the rectifier stage 1 and by the inverter stage 2 are of opposite signs, the following relation expressing the total common mode voltage generated on the variable speed drive is obtained:

$$Vmc = \frac{V_{U0} + V_{V0} + V_{W0}}{3} - \frac{V_{R0} + V_{S0} + V_{T0}}{3}$$

By considering that the rectifier stage 1 and the inverter stage 2 switch at the same switching frequency, a variable speed drive with active rectifier therefore generates twice as many variations of the common mode voltage as a conventional variable drive.

From patent application EP2442436A2 is known a process for synchronizing the switchings between the rectifier stage and the inverter stage making it possible to compensate the common mode voltage generated by the inverter stage 2 by the common mode voltage generated by the rectifier stage 1, or vice versa. Other less effective processes have also been described in earlier documents.

The method of control described in patent application EP2442436A2 consists in controlling the inverter stage 2 and the rectifier stage 1 in a synchronized (time-wise) manner in such a way that a variation in potential (=rising edge or falling edge) applied to an input phase R, S, T always corresponds to a variation in potential (=rising edge or falling edge) of the same sign applied to an output phase U, V, W.

Preferably, the principle of the invention described in the present application is superimposed on an earlier process for synchronizing switchings, such as the one described in application EP2442436A2.

The method of control of the invention is directed moreover at taking account of the voltage variations (dv/dt) generated by each switching of the transistors of the inverter stage 2 and of the transistors of the rectifier stage 1. The aim of the method of the invention is to attenuate, even to remove, the common mode voltage by synchronizing the voltage variations generated by the two switchings on the rectifier stage 1 and on the inverter stage 2.

In the subsequent description, we will consider the switching of a transistor 100 of the rectifier stage 1 and the corresponding switching of a transistor 200 of the inverter stage 2. In a known manner, the switching of a transistor is carried out by applying a constant gate current to its gate.

The synchronization of the voltage variations generated by each of the two switchings consists in obtaining, for the two voltage variations, one and the same rate of variation or, stated otherwise one and the same slope if the two curves of variation of the voltage generated by each of the two switchings are considered.

To vary this slope, the invention consists in acting on the gate current Ige applied to the transistor 100 of the rectifier stage and on the gate current Igs applied to the transistor 200 of the inverter stage.

Figure 3A:
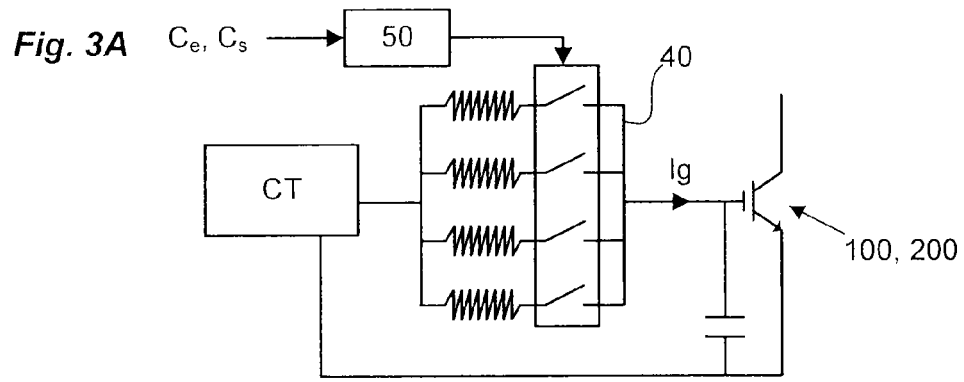
FIGS. 3A and 3B represent two possible variants to be implemented in the variable speed drive of the invention to vary the gate current of a transistor to be controlled.
Figure 3B:
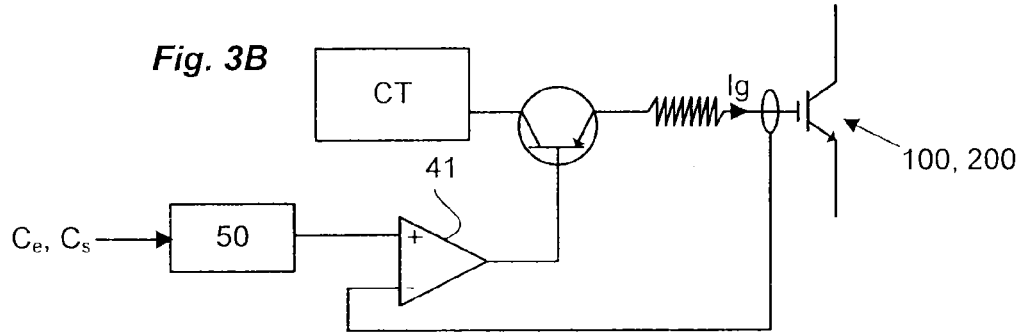

Various solutions make it possible to vary the gate current. Exemplary embodiments are represented in FIGS. 3A and 3B. In FIG. 3A, a set of controlled resistors 40 is placed at the output of the controlled transistor's control device and connected to the gate of the controlled transistor 100, 200. The resistors are connected in parallel but it would also be possible to position them in series. Another solution represented in FIG. 3B consists for example in employing a current source controlled by an analogue circuit 41.

Figure 2:
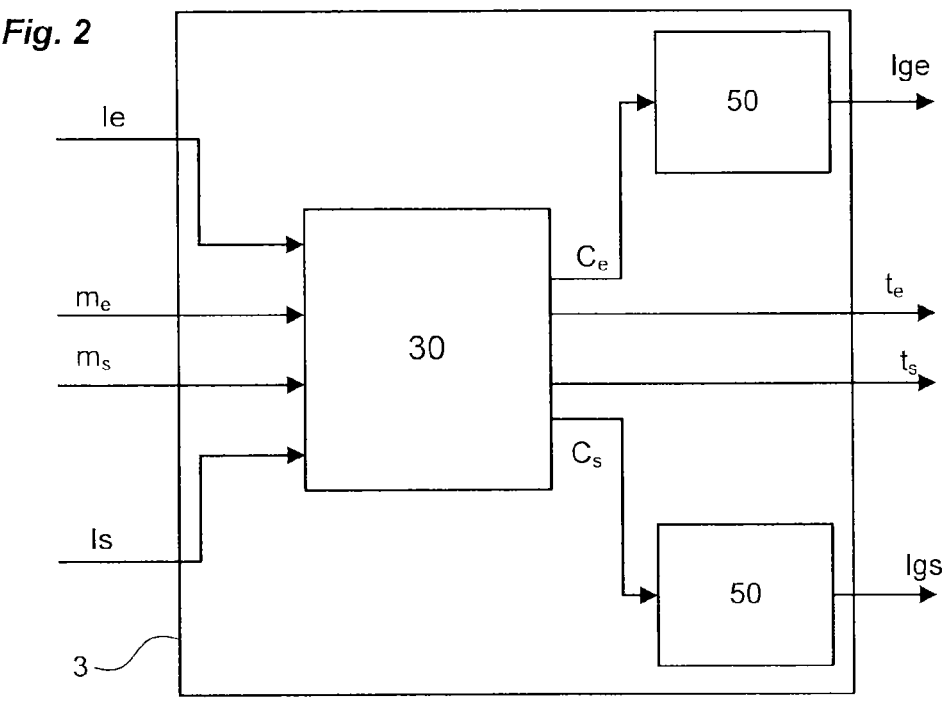
FIG. 2 illustrates the method of control of the invention, implemented in the variable speed drive of the invention.

According to the invention such as represented in FIG. 2, the control unit 3 receives as input the input current Ie present on the input phases R, S, T, the output current Is present on the output phases U, V, W, the modulant $m_e$ of the PWM control of the rectifier stage 1 and the modulant $m_s$ of the PWM control of the inverter stage 2. On the basis of these data, the method of the invention therefore consists in implementing in a calculation module 30 of the control unit 3, said calculation module 30 comprising:
  a first module for determining a first control signal $C_e$ corresponding to a first gate current Ige to be applied to the gate of the transistor of the rectifier stage 1,
  a second module for determining a second control signal $C_s$ corresponding to a second gate current Igs to be applied to the gate of the transistor of the inverter stage 2, and
  a third module for determining a first instant of switching $t_e$ of the transistor of the rectifier stage 1 and a second instant of switching $t_s$ of the transistor of the inverter stage 2.

To determine the two control signals representative of the gate currents to be applied to the transistors, the determining modules take account of the input current or of the output current loading the capacitance of the gate of the transistor. The evolution of the loading in current of this gate capacitance being known, it is possible to ascertain the slope of the variation of the voltage and therefore to adjust the value of the gate current to be applied to the controlled transistor.

The first control signal $C_e$ and the second control signal $C_s$ are each dispatched to a control device 50 making it possible to vary the gate current Ige, Igs destined for the transistor to be controlled, said gate current normally being generated by a conventional gate control device CT ("gate driver"). Preferably, the two control devices 50 form part of the control unit 3.

The first control signal $C_e$, the second control signal $C_s$, the first instant of switching $t_e$ and the second instant of switching $t_s$ are determined by the control unit 3 so as to minimize the difference between the voltage Vrec generated by the switching of the transistor of the rectifier stage 1 and the voltage Vinv generated by the switching of the transistor of the inverter stage 2.

Preferably, as described in the earlier patents, the first instant of switching $t_e$ and the second instant of switching $t_s$ are identical so as to synchronize the switchings and therefore to minimize the common mode voltage generated.

Figure 4A:
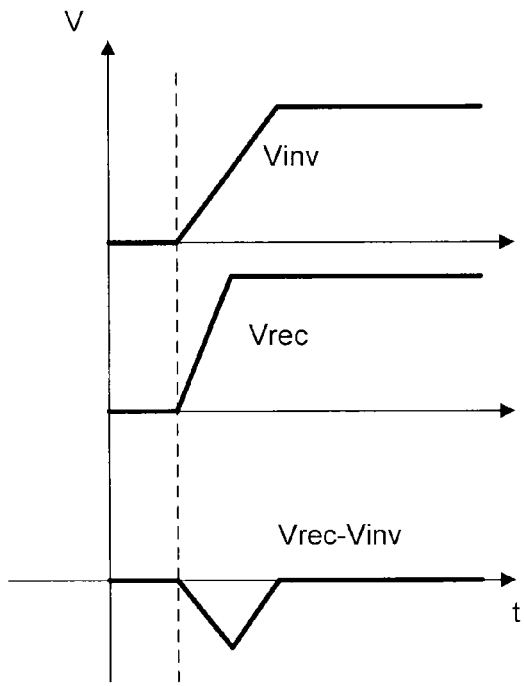
FIGS. 4A and 4B represent two curves making it possible to illustrate the benefit of the solution of the invention.
Figure 4B:
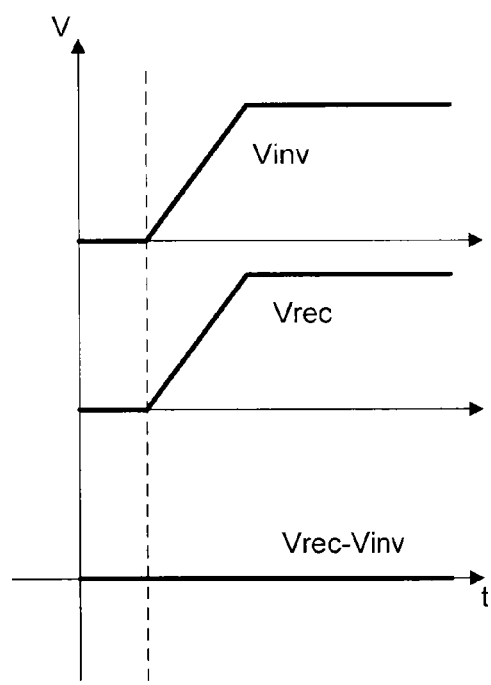

In addition to the synchronization of the switchings, the first control signal $C_e$ and the second control signal $C_s$ make it possible to act on the rates of variation of the voltages generated during the switchings. Preferably, the two control signals are determined in such a way that the two rates are equal. In FIG. 4A, the instants of switching $t_e$, $t_s$ are synchronized but no action on the rates of variation of the voltages is undertaken. It may be seen that the difference between the voltage Vrec generated on the rectifier side and the voltage Vinv generated on the inverter side is not zero, thus causing a common mode voltage. In FIG. 4B, the instants of switching $t_e$, $t_s$ are synchronized, as are the slopes of the voltage variations. In this manner the voltage difference is zero, thus generating no common mode voltage.

Figure 5A:
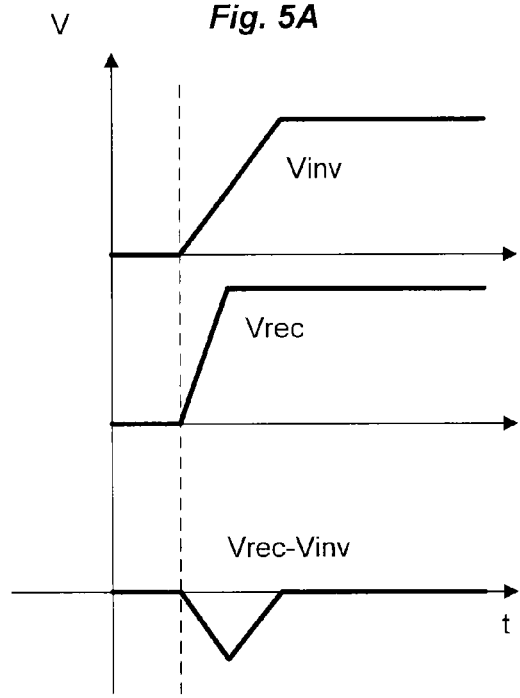
FIGS. 5A and 5B represent two curves illustrating the operating principle of a variant embodiment of the invention.
Figure 5B:
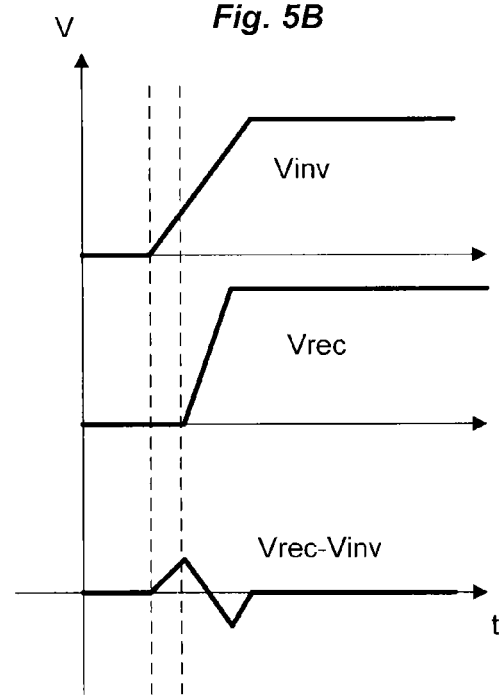

According to the invention, the first determining module and the second determining module can be designed to take account of the switching losses generated in the controlled transistor. Indeed, if the losses are apt to be too considerable, the gate current Ige, Igs generated for the control of each transistor is adjusted to take account of the Joule-effect losses brought about. Moreover, in this situation, the first instant of switching and the second instant of switching are desynchronized so as to reduce the amplitude generated by the difference between the two voltages generated by the switchings. The principle is illustrated by FIGS. 5A and 5B. In FIG. 5A, the two control signals have been generated to take account of the losses brought about, causing voltages having distinct rates of variation. The two instants of switching $t_e$, $t_s$ being synchronized, it may be seen that the difference between the voltage Vrev on the rectifier side and the voltage Vinv on the inverter side is considerable. To minimize the amplitude of the voltage difference, the two instants of switching $t_e$, $t_s$ are desynchronized as represented in FIG. 5B.

The invention claimed is:

1. Method of control implemented in a variable speed drive which comprises:
    a rectifier stage connected to several input phases receiving an input current and an inverter stage connected to several output phases on which there flows an output current destined for an electrical load,
    a DC power supply bus linking the rectifier stage to the inverter stage and comprising a first power supply line and a second power supply line,
    the rectifier stage and the inverter stage each comprising at least two switching arms connected to the first power supply line and to the second power supply line, each switching arm comprising at least two transistors,
characterized in that the method of control comprises the following steps of:
    for a switching of a transistor of the rectifier stage, determination of a first control signal corresponding to a first gate current to be applied to the gate of the transistor to be switched so as to act on the rate of the variation of a first voltage generated by the switching,
    for a switching of a transistor of the inverter stage, determination of a second control signal corresponding to a second gate current to be applied to the gate of the transistor to be switched so as to act on the rate of the variation of a second voltage generated by the switching,
    determination of a first instant of switching of the transistor of the rectifier stage and of a second instant of switching of the transistor of the inverter stage,
    the first control signal, the second control signal, the first instant of switching and the second instant of switching being determined so as to minimize the difference between the first voltage and the second voltage.

2. Method according to claim 1, characterized in that the determination of the first control signal is carried out taking account of the input current.

3. Method according to claim 1, characterized in that the determination of the second control signal is carried out taking account of the output current.

4. Variable speed drive comprising:
    a rectifier stage connected to several input phases receiving an input current and an inverter stage connected to several output phases on which there flows an output current destined for an electrical load,
    a DC power supply bus linking the rectifier stage to the inverter stage and comprising a first power supply line and a second power supply line,
    the rectifier stage and the inverter stage each comprising at least two switching arms connected to the first power supply line and to the second power supply line, each switching arm comprising at least two transistors,
characterized in that the variable speed drive comprises:
    switching of a transistor of the rectifier stage, a first module for determining a first control signal corresponding to a gate current to be applied to the gate of the transistor to be switched so as to act on the rate of the variation of a first voltage generated by the switching,
    switching of a transistor of the inverter stage, a second module for determining a second control signal corresponding to a second gate current to be applied to the gate of the transistor to be switched so as to act on the rate of the variation of a second voltage generated by the switching,
    a third module for determining a first instant of switching of the transistor of the rectifier stage and of a second instant of switching of the transistor of the inverter stage,
    the first control signal, the second control signal, the first instant of switching and the second instant of switching being determined so as to minimize the difference between the first voltage and the second voltage.

5. Variable drive according to claim 4, characterized in that the first determining module is designed to take account of the input current.

6. Variable drive according to claim 4, characterized in that the second determining module is designed to take account of the output current.

7. Variable drive according to claim 4, characterized in that the variable speed drive comprises a set of resistors connected to the gate of each transistor so as to be able to vary its gate current.

8. Variable drive according to claim 4, characterized in that the first determining module is designed to take account of the switching losses generated in the transistors to be switched of the rectifier stage.

9. Variable drive according to claim 4, characterized in that the second determining module is designed to take account of the switching losses generated in the transistors to be switched of the inverter stage.

* * * * *